United States Patent [19]
Pittinger, Jr.

[11] 3,895,440
[45] July 22, 1975

[54] DISK FOR FILAMENT TRIMMER

[76] Inventor: Charles B. Pittinger, Jr., 79 Maybin Cl., Owings Mills, Md. 21117

[22] Filed: Oct. 15, 1974

[21] Appl. No.: 514,560

[52] U.S. Cl. .................................. 30/347; 56/12.7
[51] Int. Cl.² .................. B26B 27/00; A01D 55/18
[58] Field of Search ............ 30/276, 347, 116, 117; 56/12.7, 295

[56] References Cited
UNITED STATES PATENTS

| | | | |
|---|---|---|---|
| 2,707,859 | 5/1955 | Walker | 56/12.7 X |
| 2,708,335 | 5/1955 | Newton | 56/12.7 |
| 3,018,602 | 1/1962 | Diesterweg | 56/12.7 X |
| 3,693,255 | 9/1972 | Langenstein | 30/276 |
| 3,708,967 | 1/1973 | Geist | 56/12.7 |
| 3,831,278 | 8/1974 | Voglesonger | 30/347 X |

FOREIGN PATENTS OR APPLICATIONS
1,281,450   12/1961   France ........................... 30/276

Primary Examiner—Al Lawrence Smith
Assistant Examiner—J. C. Peters
Attorney, Agent, or Firm—John F. McClellan, Sr.

[57] ABSTRACT

A disk-shaped filament holder and dispenser for a filament trimmer; the disk has a central attachment for a power drive and a plurality of circumferentially spaced holes through which a filament having one end secured to the disk is threaded; the free end of the filament during operation swings radially from the disk as the cutting filament, or filament trimmer; abrasive contour of the holes insures that the free end of the filament will fail first at the last hole through which threaded rather than at some portion of the free length; on such failure, centrifugal force pulls the stub end free from the hole at which failure occurred and swings it out radially from the disk at the next prior hole through which threaded, as a fresh cuttinglength of filament.

11 Claims, 2 Drawing Figures

PATENTED JUL 22 1975    3,895,440

DISK FOR FILAMENT TRIMMER

Cross-reference is made to my co-pending Application Ser. No. 514,561 for U.S. Pat. filed concurrently herewith and entitled "Hollow-Shaft Feed Filament Trimmer."

This invention relates generally to vegetation trimmers and the like and specifically to filament-type trimmers.

In the prior art it has been necessary to replace each length of filament when worn by some positive action, usually by installation of a fresh length.

A principal object of the present invention is to provide a filament holder and dispenser which automatically feeds out a new and exact replacement length of filament each time a prior length wears a predetermined amount.

Other objects are to provide a device as described which holds a large quantity of replacement filaments, which can easily be restrung with a fresh supply when exhausted or which can economically be discarded and replaced with an entire new unit, which holds and dispenses filaments of any customary weight and material, and which remains substantially in balance under all operating conditions.

Further objects are to provide a device as described which maximizes efficiency of cut by exposing only at a distance from the axis of rotation filament for cutting, and by supporting the filament at a long radial distance from the axis of rotation to impart a favorable drawing action to the filament when it meets resistance.

Still further objects are to provide a device as described which will operate properly regardless of how installed or which direction rotated, which resists filament tangling and wrapping when starting, stopping and cutting, which protects filament from unwanted rubbing, and which uses all the filament strung on it.

Yet further objects are to supply a device as described which cuts safely, evenly, fast, economically, and which can be adapted to fit any customary power drive.

In brief summary given for cursive description only, the device comprises a disk having means for attachment to a power drive, a series of apertures in the disk, and a filament threaded through the apertures and secured at one end with the other end free to protrude radially from the disk in operation as a filament cutter.

The above and other objects and advantages of the invention will become more readily apparent on examination of the following description, including the drawings, in which.

In the drawings, like reference numerals refer to like parts.

Figure 1:
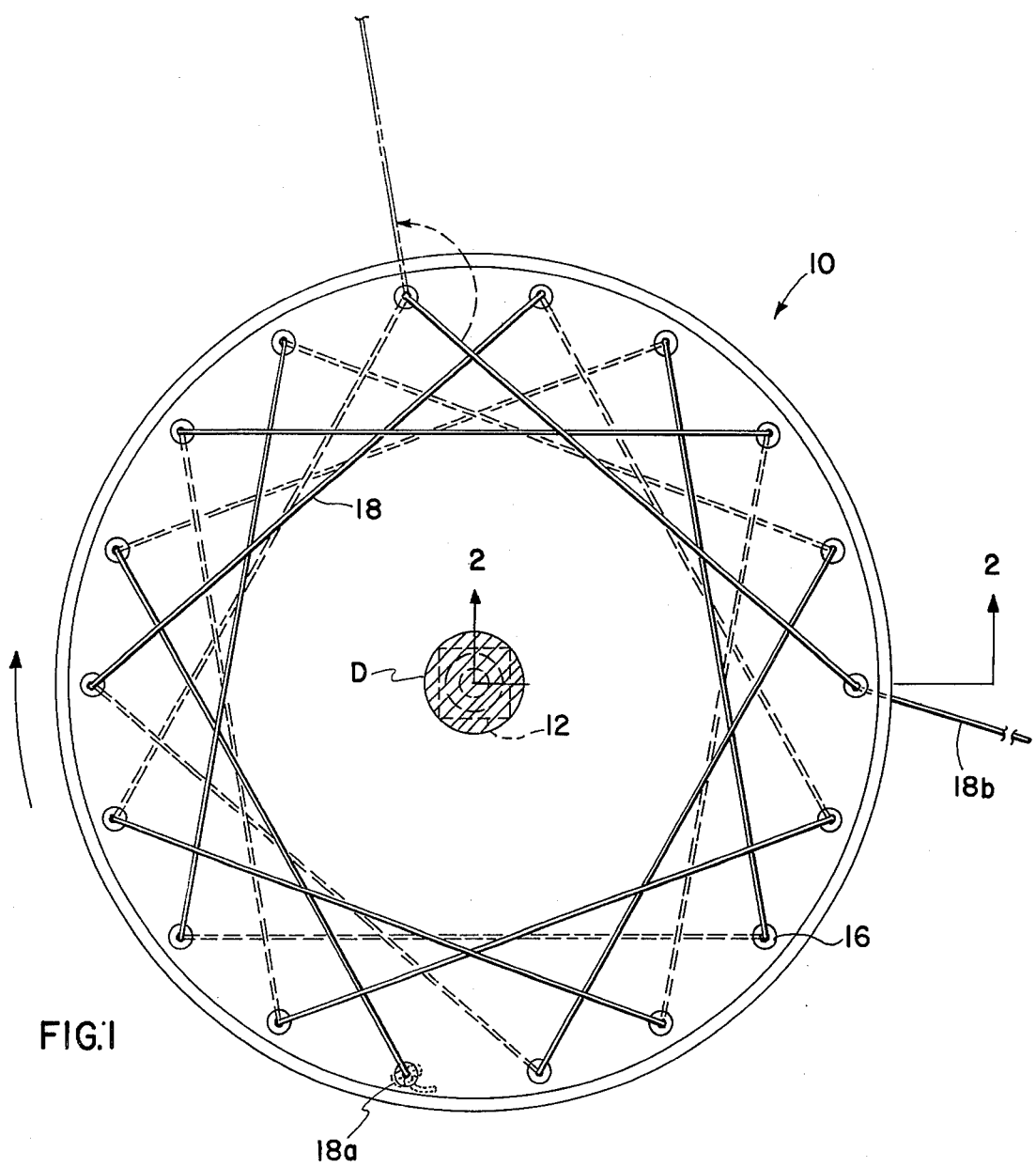
FIG. 1 is a top plan view.
Figure 2:
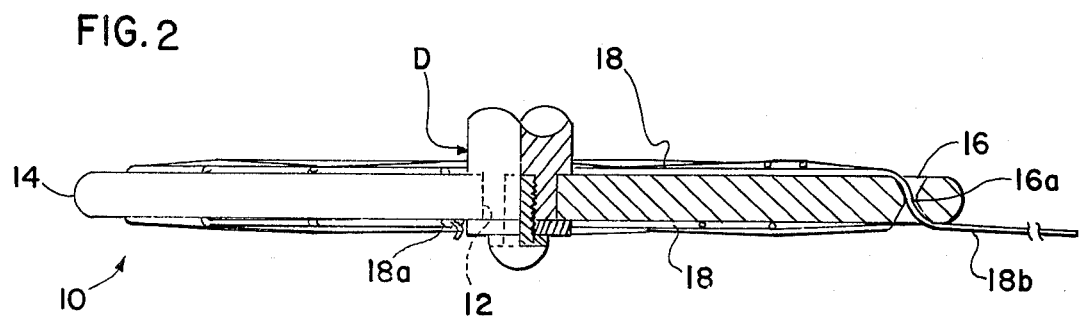
FIG. 2 is a side elevation partly in section taken at 2—2, FIG. 1.

FIGS. 1 and 2 show the filament trimmer disk 10 of this invention in the form of a circular member having in the center means such as a conventional square hole 12 for attachment to any customary power drive, represented by the driveshaft, screw and washer at D.

The disk may be of any suitable material, such as metal or plastic, and preferably has a relatively thin side elevational aspect with preferably a rounded edge 14.

A circumferential series of apertures, indicated as holes 16, preferably equally spaced around the disk near the periphery, receives a filament 18 threaded through them in a serial pattern. One end of the filament is fixed to the disk as by a knot 18a larger than the hole at which it is disposed. The free end 18b of the filament comprises the cutting length, and swings radially from the disk under the centrifugal force of operation.

In normal trimming use, eventually some distal portion of the cutting length would break first, requiring manual manipulation to unfurl a replacement length, and to measure and snip it to correct length.

However, according to another provision of this invention, each hole has an abrasive or chafing contour, as for example, the middle 16a of the symmetrical hourglass section in FIG. 2. As the free end of the cutting length of filament swings around, resistance of material cut causes some oscillation of the filament relative to the last hole through which it is threaded, the hole from which it swings out. If the contour is made very sharp, early failure will occur; if the contour is somewhat smoother, less chafing will take place and failure will occur later. In either event failure at the hole is proportional to the quantity of vegetation or other material trimmed, however the abrasive factor is adjusted.

When failure occurs at the hole the filament parts, the old length is shed and centrifugal force pulls the remaining stub from the hole and radially outward, unfurling a fresh cutting length which is in turn anchored at the next hole back in the stringing or threading series.

As shown in the FIG. 1, the filament stringing pattern can advantageously approximate a helical path, following equal distances along chords of the disk, with portions of the filament crossing. This easily provides a cutting length longer than the disk. Shorter cutting lengths can easily be provided, and automatically renewed. In any event, the diameter of the disk is preferably greater than the extended cutting length to prevent tangles and for greater cutting efficiency. Mower blade cutting tips are normally the only portions of the blades sharpened, and the present invention functions efficiently in the same manner. For ordinary mowing the extended cutting length may advantageously be greater than the disk radius but less than the diameter.

It can be seen that in a sense each hole in turn is a means for securing a portion of the filament, chafing taking place only at the hole from which the cutting length extends. The disk rounded edge prevents chafing of the filament also, when in contact during operation, and prevents damage and danger when encountering obstructions.

Obviously many modifications and variations of the present invention are possible in the light of the above teachings. For example, the size of the holes, the contour of the holes, the inertia and the radius of the disk can be varied, and various stringing patterns and hole patterns can be used. It is therefore to be understood that within the scope of the appended claims the invention may be practiced otherwise than as specifically described.

What is claimed and desired to be secured by United States Letters Patent is:

1. In a filament trimmer, a disk having means centrally thereof for attachment to a rotary drive, structure defining at least one aperture in the disk at a location proximate the perimeter thereof, a filament, means for securing a portion of the filament to the disk at a location circumferentially spaced from said aperture, and the filament passing through said aperture and extending as a cutting length therepast a distance substantially equal to the distance between said aperture and means for securing, whereby on parting of the filament at the aperture the filament will extend as a cutting length from said securing means a distance substantially equal to the distance previously extended past the aperture.

2. In a filament trimmer as recited in claim 1, said at least one aperture having means for selectively abrading the filament on filament motion relative to the aperture.

3. In a filament trimmer as recited in claim 2, said at least one aperture being a perforation through the disk.

4. In a filament trimmer as recited in claim 3, said at least one aperture having an hourglass sectional shape comprising the means for selectively abrading the filament.

5. In a filament trimmer as recited in claim 2, a plurality of said apertures spaced around the disk.

6. In a filament trimmer as recited in claim 5, the filament extending substantially equal distances along chords of the disk sequentially to plural of the apertures in said disk.

7. In a filament trimmer as recited in claim 5, the filament extending in succession to said plurality of apertures in a path approximating a helix, with portions of the filament crossing other portions thereof.

8. In a filament trimmer as recited in claim 7, the apertures being perforations through the disk.

9. In a filament trimmer as recited in claim 8, the disk having a rounded edge as viewed in side elevation.

10. In a filament trimmer as recited in claim 7, the filament cutting length extension being greater than the radius of the disk but less than the diameter of the disk.

11. In a filament trimmer mechanism, an apertured filament-trimmer disk having threaded through plural apertures thereof a continuous filament with a portion of one end freely protrusive from the disk as a cutting length of filament, and means for causing the cutting length of filament to part at one of said apertures and another portion of said free end to protrude from another of said apertures as a fresh cutting length as result of trimming operation of said filament trimmer mechanism.

* * * * *